No. 610,237. Patented Sept. 6, 1898.
A. G. KINYON.
TRIPLE VALVE FOR AIR BRAKES.
(Application filed Mar. 5, 1898.)
(No Model.) 2 Sheets—Sheet 1.

WITNESSES

INVENTOR
Alonzo G. Kinyon
By Henry F. Noyes
ATTORNEY

No. 610,237. Patented Sept. 6, 1898.
A. G. KINYON.
TRIPLE VALVE FOR AIR BRAKES.
(Application filed Mar. 5, 1898.)

(No Model.) 2 Sheets—Sheet 2.

INVENTOR
Alonzo G. Kinyon
By Henry F. Noyes
ATTORNEY

WITNESSES
Percival Robert Moses
Louis J. Schraeder

UNITED STATES PATENT OFFICE.

ALONZO G. KINYON, OF CHICAGO, ILLINOIS.

TRIPLE VALVE FOR AIR-BRAKES.

SPECIFICATION forming part of Letters Patent No. 610,237, dated September 6, 1898.

Application filed March 5, 1898. Serial No. 672,672. (No model.)

*To all whom it may concern:*

Be it known that I, ALONZO G. KINYON, of Chicago, in the county of Cook and State of Illinois, have invented certain new and useful Improvements in Triple Valves for Air-Brakes, of which the following is a specification.

This invention relates to air-brakes, and in particular to triple valves.

One object of this invention is to provide a simple organization of mechanisms of this class.

A further object of this invention is to provide a main valve and valve-seat which may be easily removed for inspection.

A further object of this invention is to provide an emergency-piston comprising a main valve and valve-seat.

Further objects of this invention will be hereinafter stated.

In the usual construction of triple valves the main-valve seat is a cylinder or bushing tightly and fixedly driven into the valve-casing and having constructed in the interior thereof a flat longitudinal track or seat to receive the main valve. The usual port-openings are drilled in this seat and the main valve is ground to a tight joint with the seat. It is evident that it is a matter of considerable difficulty and expense to manufacture these seats; but a greater difficulty occurs if the valve-seat becomes injured in any way, as by the presence of a small piece of gritty dirt, after the seat has been fitted in place in the casing or after the valves have been placed on the car. Then it becomes necessary to remove the bushing and either furnish a new one in its place or to regrind the seat. This involves removing the triple valve from its place on the car and makes the whole operation one of considerable magnitude, and the necessity of this operation frequently occurs. One object of this invention is to provide an easy means of removing this valve-seat and to simplify the construction by utilizing the emergency-piston for this purpose and so constituting it that it comprises in itself the main valve and valve-seat, whereby by taking off one of the outer caps of the casing, as has been necessary in the usual construction of triple valve to remove the emergency-piston, the main valve and seat may be easily removed for inspection and repair.

Figure 1:
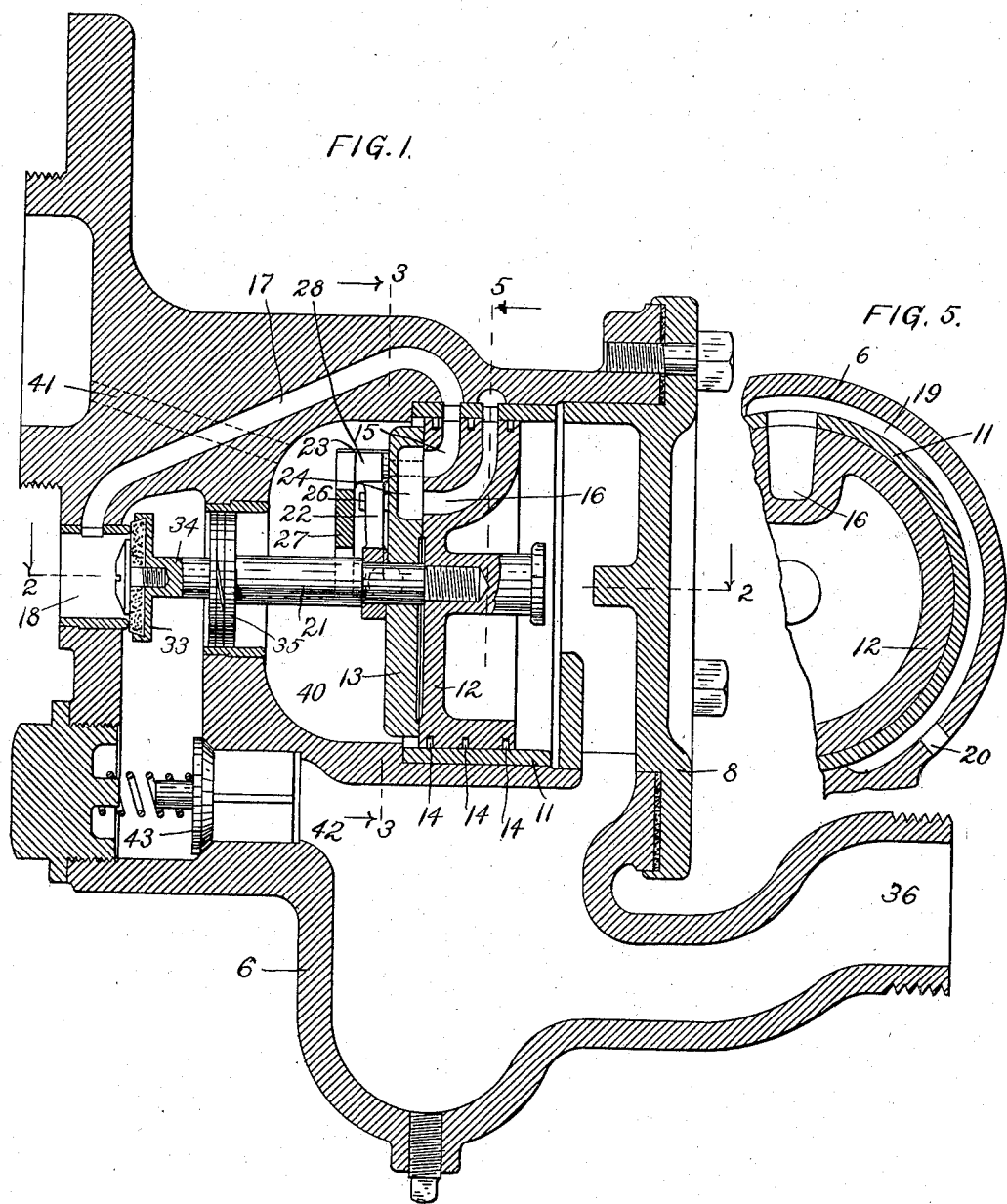
Figure 2:
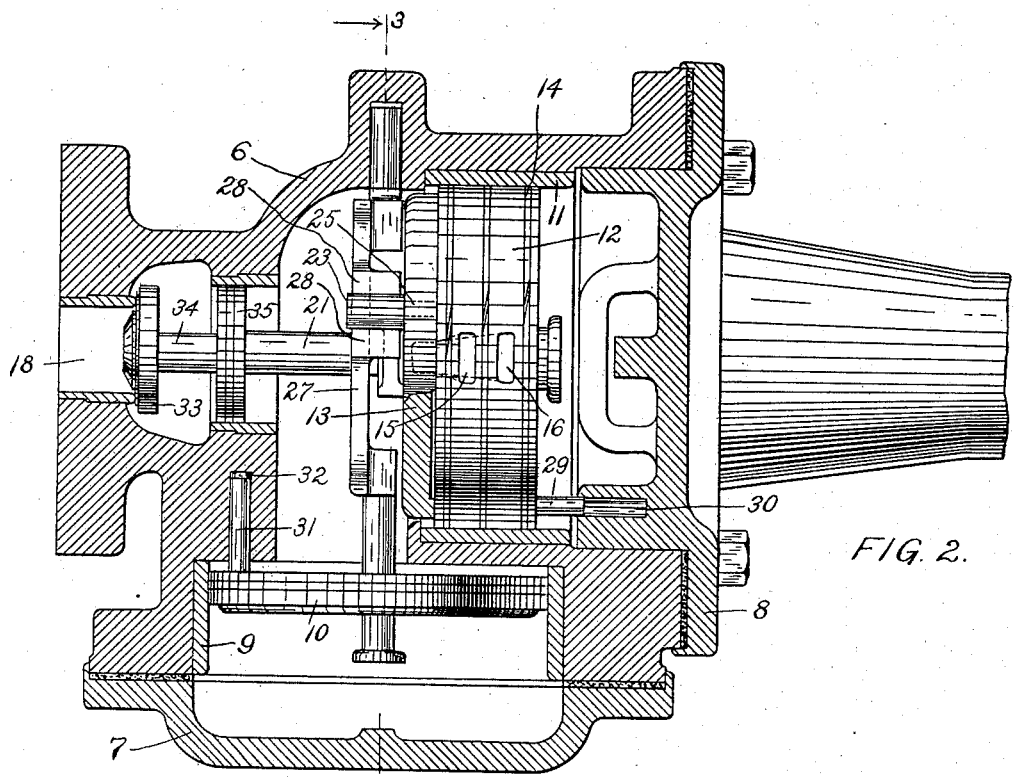
Figure 4:
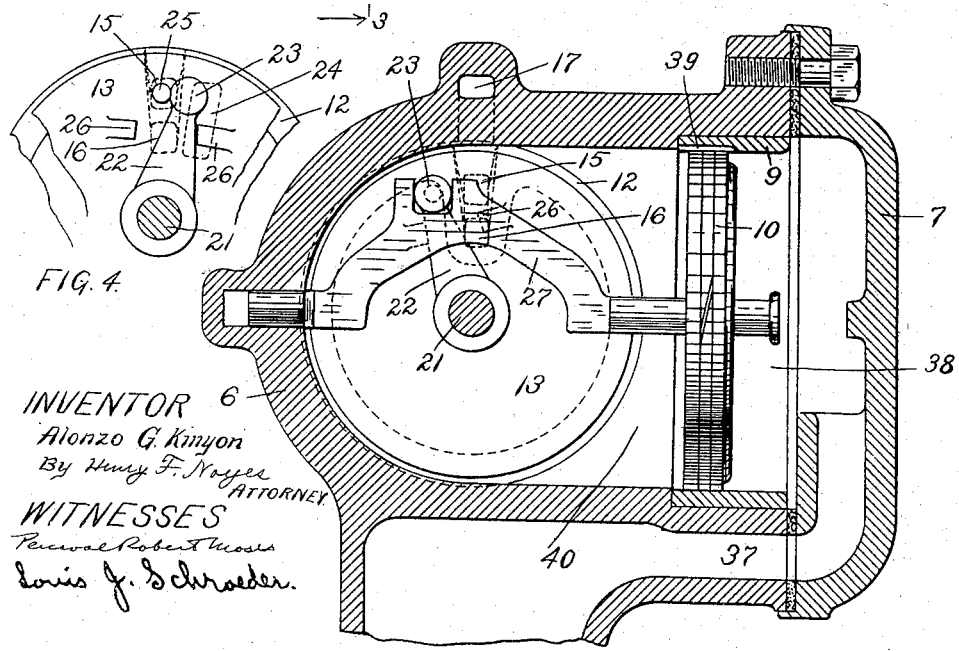

In the drawings accompanying and forming a part of this specification, Figure 1 is a longitudinal vertical section of this improved triple valve. Fig. 2 is a horizontal section taken in line 2 2 of Fig. 1. Fig. 3 is a transverse vertical section taken in line 3 3 of Figs. 1 and 2. Fig. 4 is a partial view of the main valve, showing the position of its operating mechanism during a certain period in its cycle of operation; and Fig. 5 is a partial transverse section of the casing, taken in line 5 of Fig. 1.

The organization of mechanisms herein shown and described comprises an outer casing 6, having bolted thereto the caps 7 and 8, suitable packing being interposed to make a good joint. Working in this casing in a suitable bushing 9 is the main piston 10. Working in the bushing 11 is the main-valve seat 12 and main valve 13, together comprising the emergency-piston and adapted for sliding movement in the bushing 11. The main-valve seat is provided with suitable packing-rings 14 and with the port-openings 15 and 16.

The port-opening 15 communicates through the passage 17 with a larger opening 18, leading to a brake-cylinder. The port-opening 16 communicates, through the semi-annular groove 19, with the exhaust-port 20.

The rod 21 is firmly fastened to the valve-seat and has pivoted thereon the main valve 13 and the oscillating arm 22, which carries the supplementary valve 23. The under side of the valve 13 is provided with a recess 24, adapted in one position of the valve to register with the ports 15 and 16 and thereby open communication between the brake-cylinder and the atmosphere. The adjoining faces of the main valve and main-valve seat are ground together to an air-tight joint. The main valve is also provided with a port or aperture 25, adapted in one position of the valve to register with the port 15 and thereby the brake-cylinder. The supplemental valve 23 controls the port 25. The main valve is provided with two stop-lugs 26 in the path of and adapted to engage the arm 22 and disposed such a distance apart as to allow this arm a certain amount of lost motion between them. To operate this arm and the main valve, the main piston 10 is connected thereto by means of a stem 27, provided with two lugs 28, disposed transversely thereto and adapted to receive between them the supplementary valve 23. These lugs are made of sufficient length that the emergency-piston may have a certain movement transversely thereto without carrying the supplemental valve 23 out of engagement with these lugs, so that the operative connection with the main piston may not be disturbed by any movement of the main valve and valve-seat in their capacity of emergency-piston.

To prevent any rotary movement of the main-valve seat or of the main piston, the former is provided with the guide-pin 29, working in a drilled hole 30, and the latter with the guide-pin 31, working in the hole 32.

The emergency-valve 33, controlling the opening 18, leading to the brake-cylinder, is connected with the cylindrical partition 35 by the stem 34, and the partition is connected with the rod 21, fastened to the emergency-piston, so that the emergency-piston, partition 35, and emergency-valve all move together. Train-pipe connections are made with the valve at the opening 36, whence the passage 37 leads to the chamber 38 on one side of the main piston. Thence through the feed-groove 39 fluid-pressure passes to the chamber 40, behind the main and emergency pistons, which chamber is in communication with the auxiliary reservoir through the passage 41. The train-pipe connection also communicates with the opening 18 by means of the separate passage 42, in which the check-valve 43 is interposed.

When an ordinary or "service" application of the brakes is desired, a comparatively small reduction of pressure, such as six or eight pounds, is made in the train-pipe. The pressure in the chamber 38 being less than that on the other side of the main piston, the piston travels outward, first actuating the supplementary valve 23 and arm 22 until the latter takes up the lost motion between the lugs 26, which is sufficient to effect the full opening of the port 25. The arm 22 then engages one of the lugs 26, and the further movement of the piston imparts to the main valve 13 a rotary movement until the recess 24 is out of register with the ports 15 and 16 and until the port 25 registers with the port 15. The mechanisms are then in the position shown in Fig. 4. Auxiliary-reservoir pressure passes through the ports 25 15 and passage 17 to the brake-cylinder until the pressure in the chamber 40 behind the main piston has become lowered slightly below that in the chamber 38, which occasions a slight return movement of the piston until the lost motion of the arm 22 between the lugs 26 is again taken up. Further movement of the piston is at this point prevented by the inertia of the main valve, due to its pressure and consequent friction upon its seat. This slight return movement of the piston is sufficient to cause the supplementary valve 23 to close the port 25 against further admission of auxiliary-reservoir pressure to the brake-cylinder, and the brakes remain applied during this period. If a harder application is desired, a further slight reduction of the train-pipe pressure causes the main piston to again move outward, opening the supplementary valve and allowing a further admission of pressure to the brake-cylinder, and this operation may be repeated until the brakes have been applied as hard as is desired, or until the brake-cylinder and auxiliary-reservoir pressures become equalized. To release the brakes, an increase of train-pipe pressure is made sufficient to cause the main piston after the lost motion of the arm 22 between the lugs 26 has been taken up to return with the main valve to the position shown in Fig. 3, when brake-cylinder pressure is released through the passage 17, port 15, recess 24, port 16, passage 19, and exhaust-port 20 to the atmosphere.

It will be noted that the emergency-valve 33 is normally held to its seat by the train-pipe pressure and that the check-valve 43 prevents a reduction of this pressure when a service application is made. The proportionate areas of this valve and the emergency-piston are made such that during an ordinary or service reduction of train-pipe pressure the total unbalanced pressure on the emergency-piston is not sufficient to overcome the pressure holding the emergency-valve to its seat. If, however, an emergency application is desired, a reduction of train-pipe pressure of ten or twelve pounds is sufficient to enable the emergency-piston to open the valve 33 and permit the direct admission of pressure from the train-pipe to the brake-cylinder.

If for any reason it is desired to inspect the main valve and seat or the emergency-piston or if any repairs on the same are necessary, by the removal of the cap 8 these mechanisms may be all removed together, and it is not necessary to disturb the valve-casing from its place beneath the car nor even to remove the train-pipe connections. The removal of the cap 7 also affords easy access to the main piston.

The main valve and its seat perform the functions of the emergency-valve, as well as their own functions, thereby effecting a reduction in the number of parts and a greater simplicity of construction and as an organization involving a distinct departure in the art.

It is evident that a reciprocating or slide valve could with equal facility be used in place of the rotary valve by a change in the arrangement of the ports. I therefore do not wish to be limited to this precise construction, but include within the scope of this invention an emergency-piston comprising any valve and valve-seat having any of the functions of the main valve.

While for the purposes of this specification I have described in particular the disposal and construction of mechanisms herein set forth, I do not desire to be limited thereto unduly, as I contemplate all proper changes of construction and disposal of parts as may be deemed necessary.

I claim as my invention—

1. In a triple valve for air-brakes, the combination of a casing; an emergency-piston disposed within said casing and comprising a main valve and main-valve seat; a main piston connected with said emergency-piston; and an emergency-valve connected with said emergency-piston.

2. In a triple valve for air-brakes, the combination of a casing; an emergency-piston disposed within said casing and comprising a rotary valve and valve-seat; a main piston operating said rotary valve; and an emergency-valve connected with said emergency-piston.

3. In a triple valve for air-brakes, a casing; a main valve and main-valve seat disposed within said casing; an emergency-valve connected with said main valve and seat, whereby said valve and seat are adapted to operate said emergency-valve.

4. In a triple valve for air-brakes, a casing; a main valve and main-valve seat disposed within said casing; and a main piston and an emergency-valve connected with said main valve, whereby said main piston is adapted to operate said main valve, and whereby said main valve and valve-seat are adapted to operate said emergency-valve.

5. In a triple valve for air-brakes, a casing; a rotary valve and valve-seat disposed within said casing; an emergency-valve connected with said rotary valve and valve-seat, whereby said valve and seat are adapted to operate said emergency-valve.

6. In a triple valve for air-brakes, a casing; a rotary valve and valve-seat disposed within said casing; a main piston and an emergency-valve connected with said rotary valve and seat, whereby said main piston is adapted to operate said rotary valve, and said rotary valve and valve-seat are adapted to operate said emergency-piston.

7. In a triple valve for air-brakes, a casing; an emergency-piston disposed within said casing and comprising means of controlling port-openings leading to an auxiliary reservoir and a brake-cylinder; an emergency-valve connected with said piston; and a main piston connected with said emergency-piston.

8. In a triple valve for air-brakes, a casing; an emergency-piston disposed within said casing and comprising means of controlling port-openings leading to a brake-cylinder and the atmosphere; an emergency-valve connected with said piston; and a main piston.

9. In a triple valve for air-brakes, a casing; an emergency-piston disposed within said casing and comprising means of controlling port-openings leading to an auxiliary reservoir and a brake-cylinder, and a brake-cylinder and the atmosphere respectively; an emergency-valve connected with said piston; and a main piston.

10. In a triple valve for air-brakes, a casing; an emergency-piston disposed within said casing and including a main valve and a valve-seat, and said main valve adapted to control port-openings leading to an auxiliary reservoir and a brake-cylinder, and to a brake-cylinder and the atmosphere respectively; a main piston adapted to operate said main valve; and an emergency-valve connected with said emergency-piston.

11. In a triple valve for air-brakes, a casing; an emergency-piston disposed within said casing and including a rotary valve and a valve-seat; said rotary valve adapted to control port-openings leading to an auxiliary reservoir and a brake-cylinder, and to a brake-cylinder and the atmosphere respectively; a main piston adapted to operate said rotary valve; and an emergency-valve connected with said emergency-piston.

12. In a triple valve for air-brakes, a casing; a cylindrical valve-seat provided with port-openings adapted to register with openings leading to a brake-cylinder and the atmosphere; a main valve connected with said valve-seat and adapted to control said ports; a main piston adapted to operate said main valve; and an emergency-valve connected with said cylindrical valve-seat.

13. In a triple valve for air-brakes, a casing; a cylindrical valve-seat provided with port-openings leading to a brake-cylinder and the atmosphere; a rotary valve connected with said valve-seat and adapted to control said ports; a main piston adapted to operate said main valve; and an emergency-valve connected with said cylindrical valve-seat.

14. In a triple valve for air-brakes, a casing; a cylindrical valve-seat and rotary valve connected with an emergency-valve and adapted to operate said emergency-valve; said cylindrical valve-seat provided with port-openings adapted to register with openings leading to a brake-cylinder and an auxiliary reservoir, and a brake-cylinder and the atmosphere respectively; said rotary valve adapted to control said port-openings; and a main piston adapted to operate said rotary valve.

15. In a triple valve for air-brakes, a casing; a valve-seat provided with port-openings leading to an auxiliary reservoir and a brake-cylinder, and to a brake-cylinder and the atmosphere respectively; a rotary valve provided with a recess adapted to register with said port-openings leading to a brake-cylinder and the atmosphere, and provided with an aperture adapted to register with said port-opening leading to a brake-cylinder and an auxiliary reservoir; a supplementary valve adapted to control said aperture; and a piston and an emergency-valve suitably connected with said supplementary valve and said rotary valve.

16. In a triple valve for air-brakes a casing; a rotary valve adapted to control port-openings leading to an auxiliary reservoir and a brake-cylinder, and a brake-cylinder and the atmosphere respectively; a port-opening through said rotary valve and a supplemental valve adapted to control said port; and a main piston adapted to operate said supplemental and rotary valve, and an emergency-valve connected with said rotary valve.

17. In a triple valve for air-brakes; an emergency-piston comprising a main valve and a main-valve seat, substantially as described.

ALONZO G. KINYON.

Witnesses:
GEORGE C. LANG,
RICHARD J. GOETZEN.